United States Patent [19]

Clements et al.

[11] Patent Number: 4,458,311
[45] Date of Patent: Jul. 3, 1984

[54] TEXT PROCESSOR HAVING AN INTERACTIVE DISPLAY TERMINAL WHICH ALTERNATELY FUNCTIONS AS A DATA PROCESSING TERMINAL

[75] Inventors: Silous F. Clements, Georgetown; Patrick D. Motola; Dennis M. Ross; Richard O. Simpson; Shirley F. Swift; Michael N. Day, all of Austin, Tex.

[73] Assignee: International Business Machines Corporation, Armonk, N.Y.

[21] Appl. No.: 310,184

[22] Filed: Oct. 9, 1981

[51] Int. Cl.³ .................... G06F 15/20; G06F 3/14
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,457,368 | 7/1969 | Houcke | 178/17 |
| 3,997,895 | 12/1976 | Cassonnet et al. | 364/200 |
| 4,124,843 | 11/1978 | Bramson et al. | 340/337 |
| 4,179,735 | 12/1979 | Lodi | 364/200 |
| 4,195,353 | 3/1980 | Abe et al. | 364/900 |
| 4,198,685 | 4/1980 | Corwin et al. | 364/900 |
| 4,202,041 | 5/1980 | Kaplow et al. | 364/900 |
| 4,377,852 | 3/1983 | Thompson | 364/900 |
| 4,392,197 | 7/1983 | Couper et al. | 364/200 |

FOREIGN PATENT DOCUMENTS

| | | |
|---|---|---|
| 66674 | 12/1982 | European Pat. Off. |
| 1363910 | 8/1974 | United Kingdom |

OTHER PUBLICATIONS

Conference Proceedings, The 5th Annual Symposium on Computer Architecture, vol. 508, No. 78CH1284-9C, Apr. 3-5, 1978, pp. 39-43, IEEE Computer Society, New York, US, L. A. Hollaar: "Rotating Memory Processors for the Matching of Complex Textual Patterns".

Primary Examiner—Jerry Smith
Assistant Examiner—Mark P. Watson
Attorney, Agent, or Firm—J. B. Kraft

[57] ABSTRACT

The disclosure relates to an improvement to an information processing system for conducting data processing operations wherein the processing relates to the value of the information and conducting text processing operations wherein the processing affects only the format of information. The improvement provides the combination of means for initiating a data processing session in said system, means for switching to a text processing session before the completion of the data processing session, means for storing the status of the non-completed data processing session during the text processing session, and means for switching back from the text processing session to the non-completed data processing session.

11 Claims, 9 Drawing Figures

TEXT PROCESSOR HAVING AN INTERACTIVE DISPLAY TERMINAL WHICH ALTERNATELY FUNCTIONS AS A DATA PROCESSING TERMINAL

DESCRIPTION

1. Technical Field

This invention relates to text processing systems, i.e., information processing systems wherein the processing affects the format of the information. It provides such text processing systems with a data processing capability, i.e., processing operations wherein the processing relates to the value of the information.

2. Background Art

In prior art information processing systems, there has traditionally been a dividing line between data processing systems and text or word processing systems. The older data processing field developed over the past forty years is directed to information processing the primary purpose of which is to affect the value of the information being processed. The processing involves mathematical and other computational operations such as ordering and sorting which affect the substance or value of the information. In general, data processing is not concerned with format of the information except to the extent necessary to make the information readable or discernible to the operator either through a display or a printout. Otherwise, form is of no consequence.

On the other hand, in the newer word processing or text processing field which has developed over the past ten years, the value or substance of the information is of little consequence. Text processing is concerned with the formatting of alphanumeric data into a format or arrangement suitable for specified printed documents which are to be read and discerned by the public, e.g., letters, textbooks, magazines and newspapers.

Because of these substantial differences in functions, text processing equipment has been in general developed and marketed independent of data processing technology. Most businesses which require both data processing and text processing are likely to have independent systems for each function.

In recent years there has been some information processing equipment available which purports to carry out both data processing and text processing operations. However, such systems involve a processor which upon the loading of operational programming will act as a data processor to the completion of any initiated data processing operations. Alternatively, upon the insertion and change of operating programming, the processor may be converted into a word or text processor and perform only text processing operations until their completion.

DISCLOSURE OF THE INVENTION

The present invention provides an interactive system which is capable of switching from an initiated data processing session to a text processing session before the completion of the data processing session and then to switch back to the data processing session and resume the incomplete data processing operations at the point where the session was switched to text processing.

In accordance, the broadest aspects of the present invention, an information processing system is provided which comprises means for initiating a data processing session in said system, means for switching to a text processing session before the completion of the data processing session, means for storing the status of the non-completed data processing session during said text processing session, and means for switching back from said text processing session to said non-completed data processing session.

More particularly, the present invention utilizes a text or word processor having an interactive display terminal for conducting said text processing operations and a data processor for conducting said data processing operations. The system further includes means activated during the data processing sessions for operating the text processor as an emulation of an interactive display terminal and means for connecting said emulated display terminal to the data processor so that the emulated display terminal functions as a display terminal for said data processor.

The specific system further includes a data entry keyboard in said text processor, means for storing a plurality of different character sets, each set corresponding to the keyboard, means for selecting a character set for said keyboard for said data processing sessions and a different character set for said text processing sessions and means for switching from one of said selected character sets to the other automatically in response to the switching of sessions.

BRIEF DESCRIPTION OF DRAWINGS

Referring now to the drawings, wherein a preferred embodiment of the invention is illustrated, and wherein like reference numerals are used throughout to designate like parts.

BEST MODE FOR CARRYING OUT THE INVENTION

Figure 1:
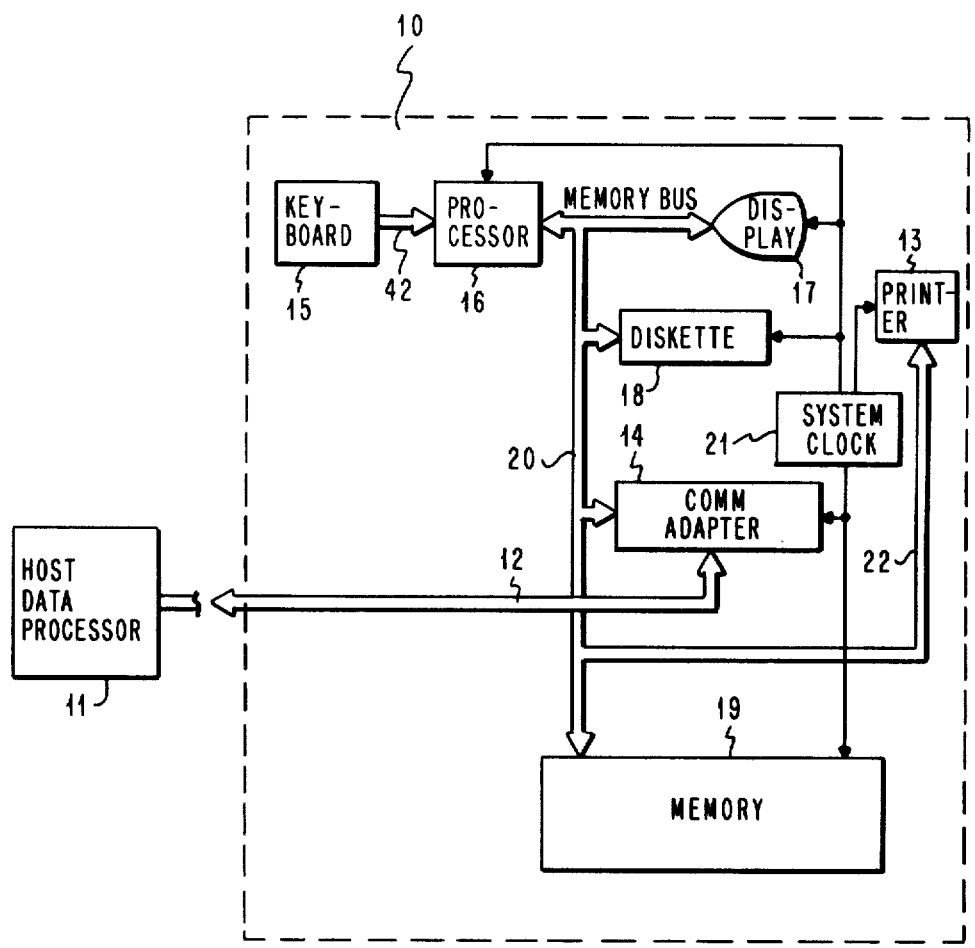
FIG. 1 is a logical block diagram showing the apparatus of the present invention in a generalized form.

With reference to FIG. 1, a generalized view of the apparatus required to carry out the present invention is shown. The system comprises a text processor 10 including a display 17. A host data processor 11 communicates with text processor 10 over bus 12. Text processor 10 includes a communications adapter 14 connected to bus 12. In text processor 10, the operator accesses the processor through operator control keys on keyboard 15. The keyboard drives a processor 16. The processor is operably connected into a visual display 17, a diskette 18, and a random access memory 19 through a memory bus 20. A system clock 21 is provided for timing functions within text processor 10. A printer 13 associated with text processor 10 is communicated with over bus 22. Memory 19 has the means for storing data and for controlling display 17 to display data or printer 13 to print data.

Memory 19 includes a number of data areas and function programs for operating with the data input into it through bus 20 from communications adapter 14.

Figure 2:
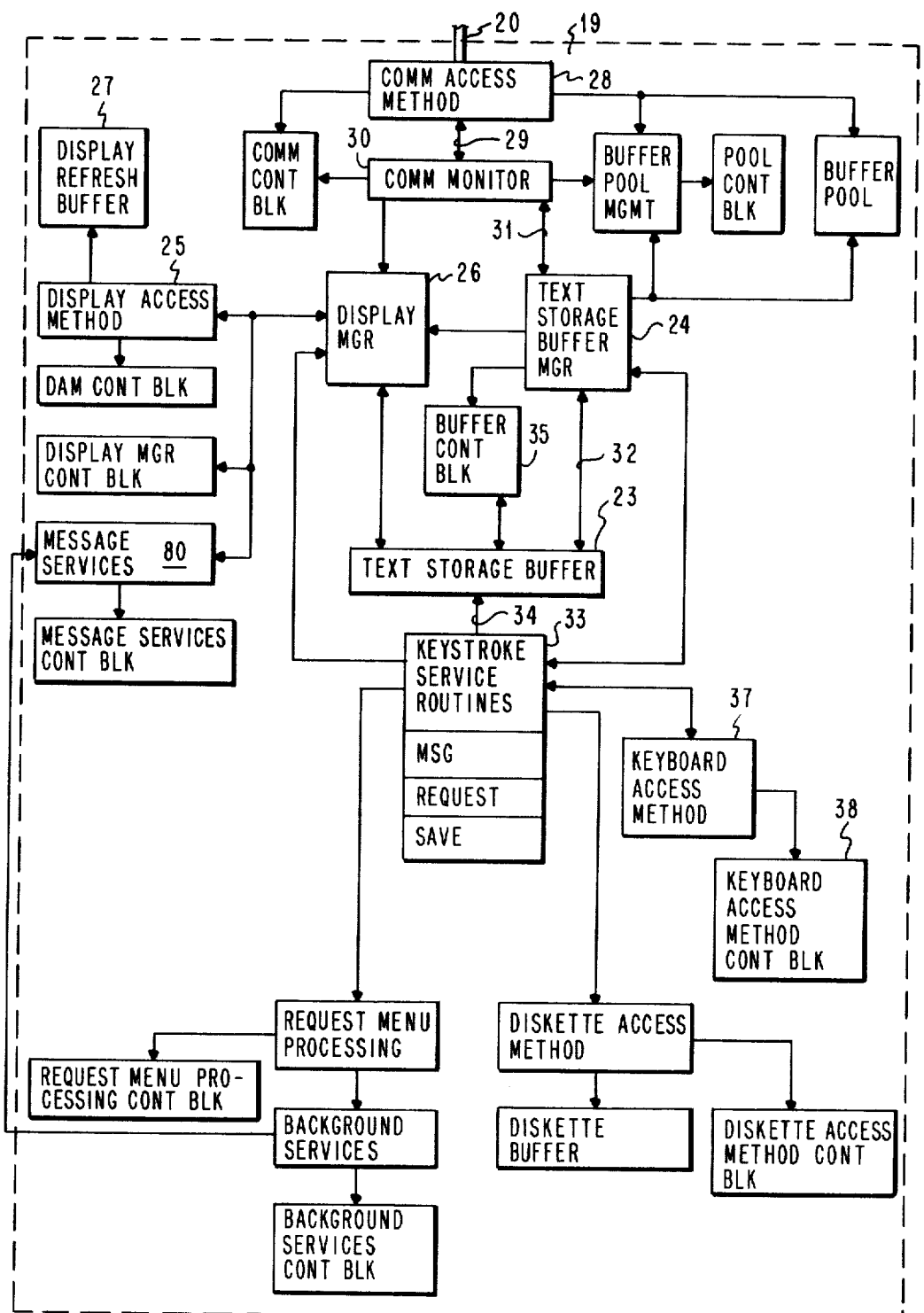
FIG. 2 is a logical block diagram showing the apparatus of the memory means in the text processor including a number of designated data areas and functional programs controlling the operation of the system.

With reference to FIG. 2 which shows the elements of memory 19, many of which will be described hereinafter in greater detail, the data to be displayed is stored in text storage buffer 23. The handling and updating of data stored in text storage buffer 23 is controlled by routine stored within text storage buffer manager block 24.

The displaying of data stored in the text storage buffer 23 on display 17 of FIG. 1 may be done in any conventional manner. For example, data may be displayed in accordance with procedure described in copending U.S. Patent application Ser. No. 208,568, filed Nov. 20, 1980, W. C. Cason et al. The data stored in text storage buffer 23 is sequential data representative of alphanumeric data. For convenience, such data may be referred to as text character data. In displaying the characters, text character data stored in buffer 23 is communicated to display access method 25 through display manager 26. The data from the display access method 25 is applied to display refresh buffer 27 which operates in the conventional manner referred to above to maintain alphanumeric text data representative of the stored data on visual display screen 17 (FIG. 1). It should be noted that display manager 26 serves to store flag and status information as required by the operation of display access method 25.

In subsequent descriptions of the operation of the present system, there will be described operations of the system as a text processing system wherein the system operates under the control of a internal processor 16 which controls memory 19 shown in detail in FIG. 2 to perform various formatting operations utilizing display 17 and to produce documents on printer 13 in accordance with the operation covered in the above-mentioned W. C. Cason et al co-pending patent application and in co-pending U.S. Patent Application Ser. No. 274,050, filed June 16, 1981, Dennis G. Busch, "Data Communications System with Receiving Terminal for Varying the Portions of Received Data Being Displayed".

In addition, there will be described data processing sessions wherein the host data processor 11 communicates with memory 19 through bus 12 and communications adapter 14 which accesses memory 19 through bus 20. In such a data processing operation, the data from communications adapter enters memory 19 (FIG. 2) on bus 20 and is input into communications access method 28 after which the data is input over channel 29 to communications monitor 30. Information from communications monitor 30 is input over channel 31 to text storage buffer manager 24 and the data is input into the text storage buffer 23 over channel 32.

Since the operator controls the processes being described through a keyboard 15 communicating through a processor 16, standard keyboard entry processes should be generally described. As the operator enters each keystroke at the keyboard 15, a corresponding signal is transmitted through channel 42 to processor 16 which enters the keystroke command into memory 19. In the memory, upon the receipt of a keystroke command, a keystroke routine is called for keystroke service routine block 33 to handle the particular command received. The keystroke command is then processed via channel 34 to text storage buffer manager block 24 which has the capability to control buffer control block 35 to carry out various processes with respect to the data stored in text storage buffer 23.

Now, using the logic and memory described above with respect to FIGS. 1 and 2, the operations involved in the present invention will be described with respect to flow charts in FIGS. 3–9. We have mentioned hereinabove that the present system has the capability of switching from a data processing session wherein text processor apparatus 10 merely serves as a display terminal under the control of host data processor 11 which communicates with processor 10 over bus 12 to a text processing session wherein text processor 10 operates in its conventional or native mode under the control of internal processor 16 and there is no control by host data processor 11. When such a switch is made, a subsequent switch can then be made back to the interrupted data processing session. Now with respect to the flow charts, we will describe how such switching may be accomplished either from a data processing session to a word processing session or back again to a data processing session. We will not describe any particular sequence of switches but merely show how the system handles such switching in either direction.

Figure 3:
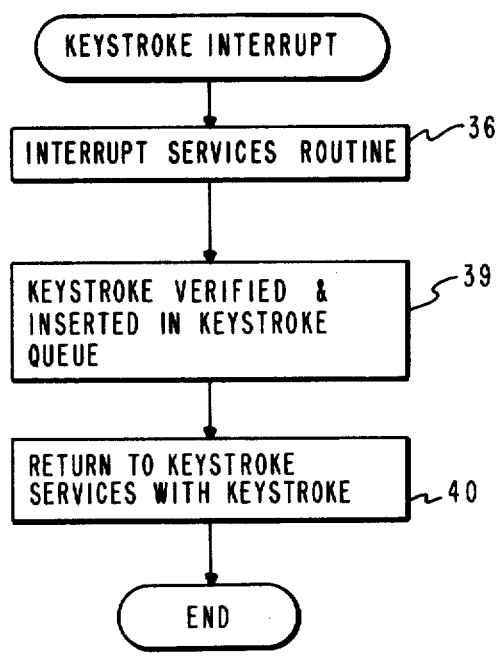
FIG. 3 shows a flow chart of the keystroke interrupt when a display session is to be switched.

Commencing with FIG. 3, we will now describe how a switch in sessions is achieved. It is initiated through the operator pressing an appropriate key on keyboard 15. This activates the keystroke interrupt routine shown in FIG. 3. First, step 36, the interrupt services routine which is found in keyboard access method 37 (FIG. 2) is carried out under the control of keyboard access method control block 38. The keystroke is verified and inserted into a keystroke queue in keyboard access method 37, step 39, FIG. 3. Then, step 40, data representative of the keystroke is applied to keystroke services block 33 which calls for the keystroke in its appropriate order in the queue, step 41, in FIG. 4 which is a flow chart of the operations in the keystroke services apparatus 33 and the keystroke indicative of a change in sessions is received by keystroke services 33. The steps in flow chart 4 are carried out in keystroke services. First, step 43, a decision is made if current session is a data processing session. If it is, then, a further decision is made, step 44, whether the particular keystroke is intended to evoke a change in session. If this is so, then, step 45, the subsequent keystrokes in the queue are flushed since they would be intended for one type of session and keyboard and we are to undergo a change in sessions. Next, step 46, the keyboard I.D. is changed. As we have mentioned hereinabove, the text processor 10 has stored therein a plurality of selectable character sets each corresponding to the keyboard. One of these character sets is customarily selected for text processing sessions and another different character set selected for data processing sessions. These character sets are of course identified by keyboard I.D.'s. Consequently, a change in keyboard I.D.'s will result in a change from one of the selected character sets associated let us say with a data processing session to the other of said selected character sets associated with a text processing session.

Figure 5:
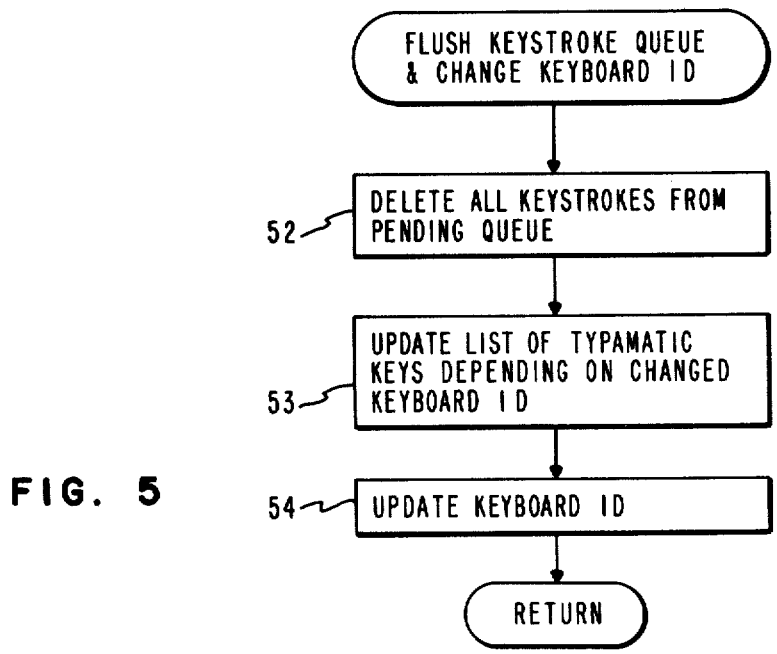
FIG. 5 is a flow chart of the routine involved in flushing keystroke queue and changing keyboard I.D. when there is to be a change in session.

The flush keystroke queue and the change keyboard I.D. routine, steps 46 and 47, will be described in somewhat greater detail subsequently with respect to the flow chart in FIG. 5. Next, step 47, the change to text processing session routine is called. This will be subsequently described in greater detail with respect to FIG. 6.

With respect to decision step 44, if the keystroke has not evoked a change in session, then, this branch of the flow charted routine is ended.

Now, going back to decision step 43, if the current session is not a data processing session, then, the process branches to step 48 where a determination is made if the keystroke evokes a change in session. If it does, then, steps 49 and 50, the routines to flush the keystroke queue and to change the keyboard I.D. are called. These will be subsequently described in greater detail with respect to the flow chart of FIG. 5. Then, step 51, the routine "change to data processing session" is called. This will be subsequently described in greater detail with respect to FIG. 7. Getting back to decision step 48, if the keystroke does not evoke a change in session, then, the routine is ended.

Now, with respect to FIG. 5, there will be described the steps involved in flushing keystroke queue and changing the keyboard I.D. These are carried out by the keyboard access method block 37 and the keyboard access method control block 38. First, step 52, all keystrokes are deleted from the pending keystroke queue. Then, step 53, the list of typamatic keys is updated. This depends on the changed keyboard I.D. In other words, in each character set representative of the keyboard, different keys may be typamatic, i.e., repetitive by being held down. This update insures that the appropriate keys in the character set represented by the changed keyboard I.D. are typamatic. Next, step 54, the keyboard I.D. for the keyboard associated with the change in session is updated. This keyboard I.D. is stored in the keyboard access method control block 38. Upon the completion of this step, the routine is completed and returned.

Figure 6:
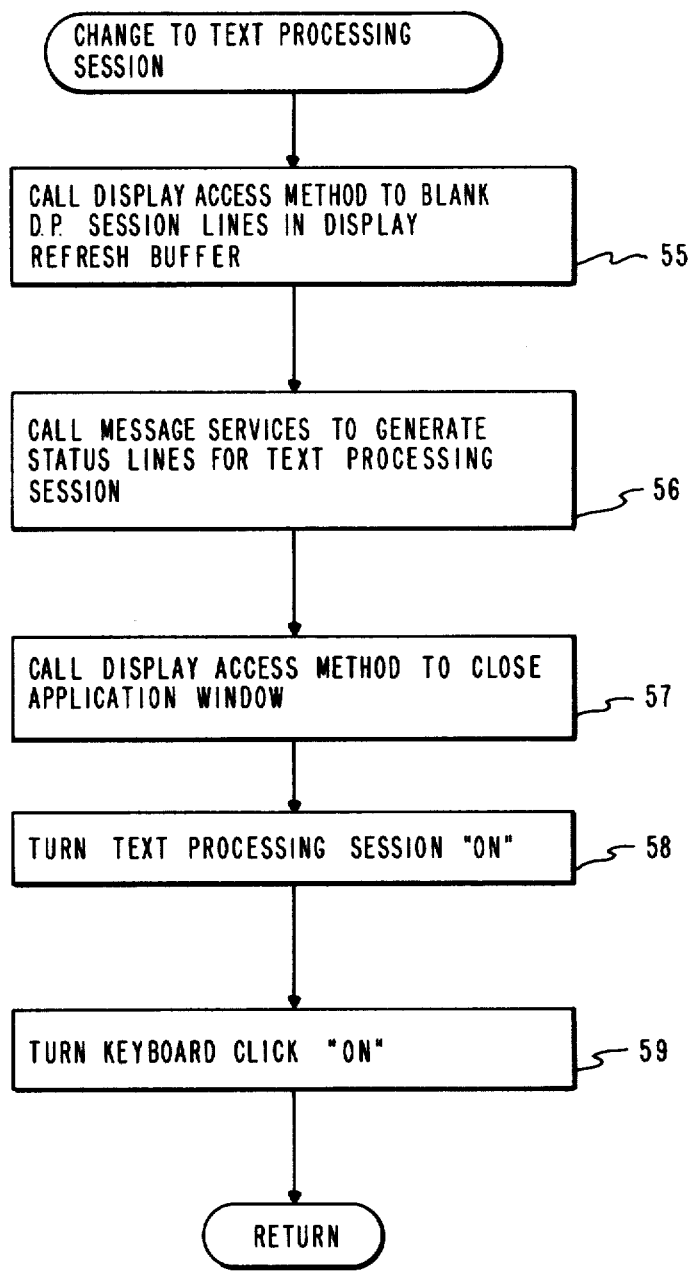
FIG. 6 is a flow chart of the changes involved in switching to a text processing session.

The routine for changing to a text processing session called for in step 47, FIG. 4 will now be described with respect to FIG. 6. Unless otherwise indicated, the steps to be described with respect to FIG. 6 are carried out under the control of the display manager 26 in FIG. 2. First, step 55, the display access method 25, is called to blank DP session lines on the display refresh buffer 27 which occupied the position in the display refresh buffer to be replaced by the text processing session status lines. It should be understood that during a text processing session, the format of display 17 is quite different than its format during a data processing session. In this step, the lines associated with the previous data processing session are now blanked in the display refresh buffer so that they will not be displayed. Next, message services routine 80 is called upon to generate the appropriate status lines for a text processing session, step 56.

Next, step 57, display access method block 25 is called to close the application window. This is another step involved in giving the display the format required for a text processing session. In effect it results in the reservation of an appropriate number of lines in display refresh buffer 27 so that there will be a corresponding number of appropriate lines for text processing display on display 17.

Next, step 58, text processing session is turned on, after which, the keyboard click is also turned on. In the applications involved in the present example, when the operator is operating in a text processing mode, keyboard keys are always given a click, step 59. On the other hand, when the system is operating in the data processing mode, this click may be on or off depending on conditions which will be hereinafter described. On the completion of these steps, routine is returned.

Figure 4:
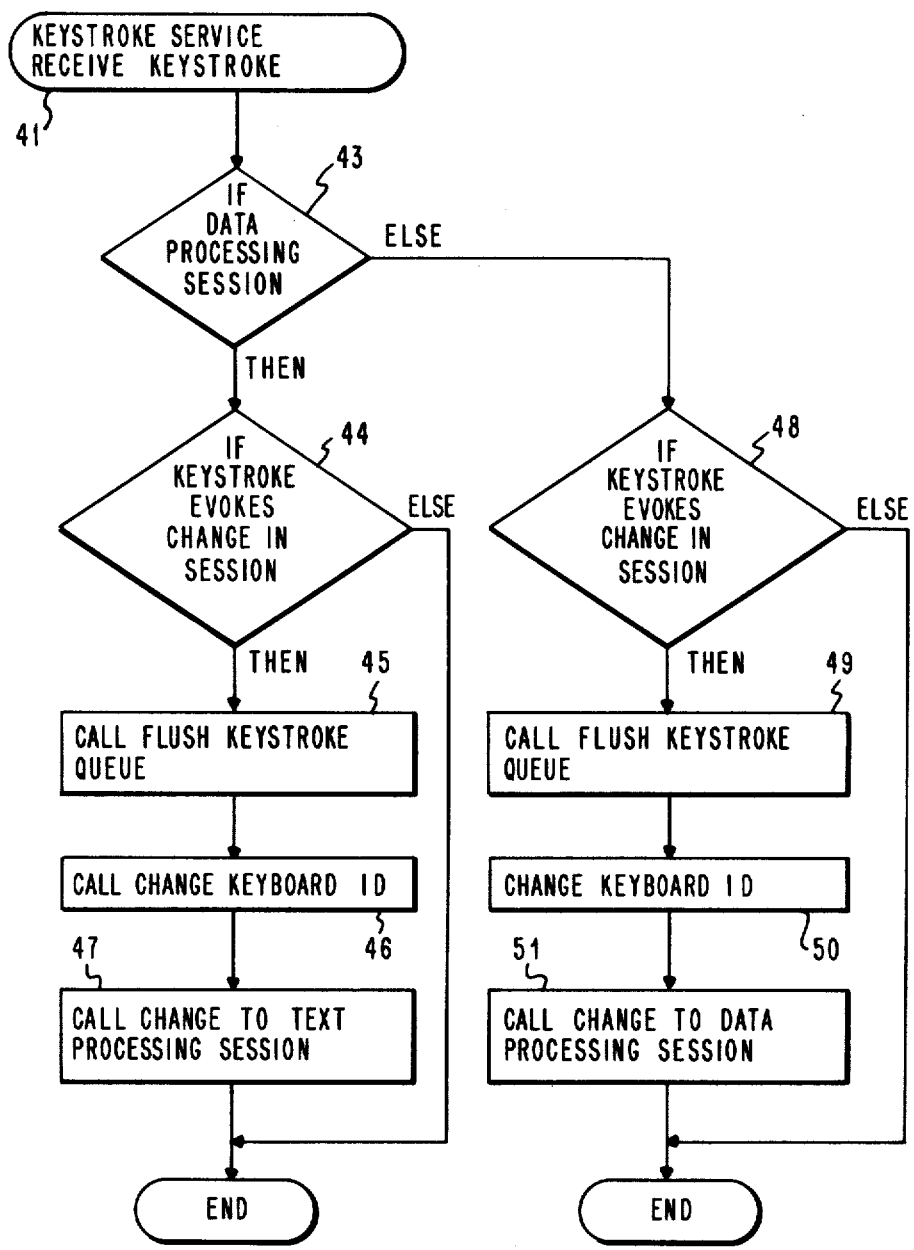
FIG. 4 is a flow chart of how the system determines whether a session switch is to be made as well as the nature of the switch.
Figure 7:
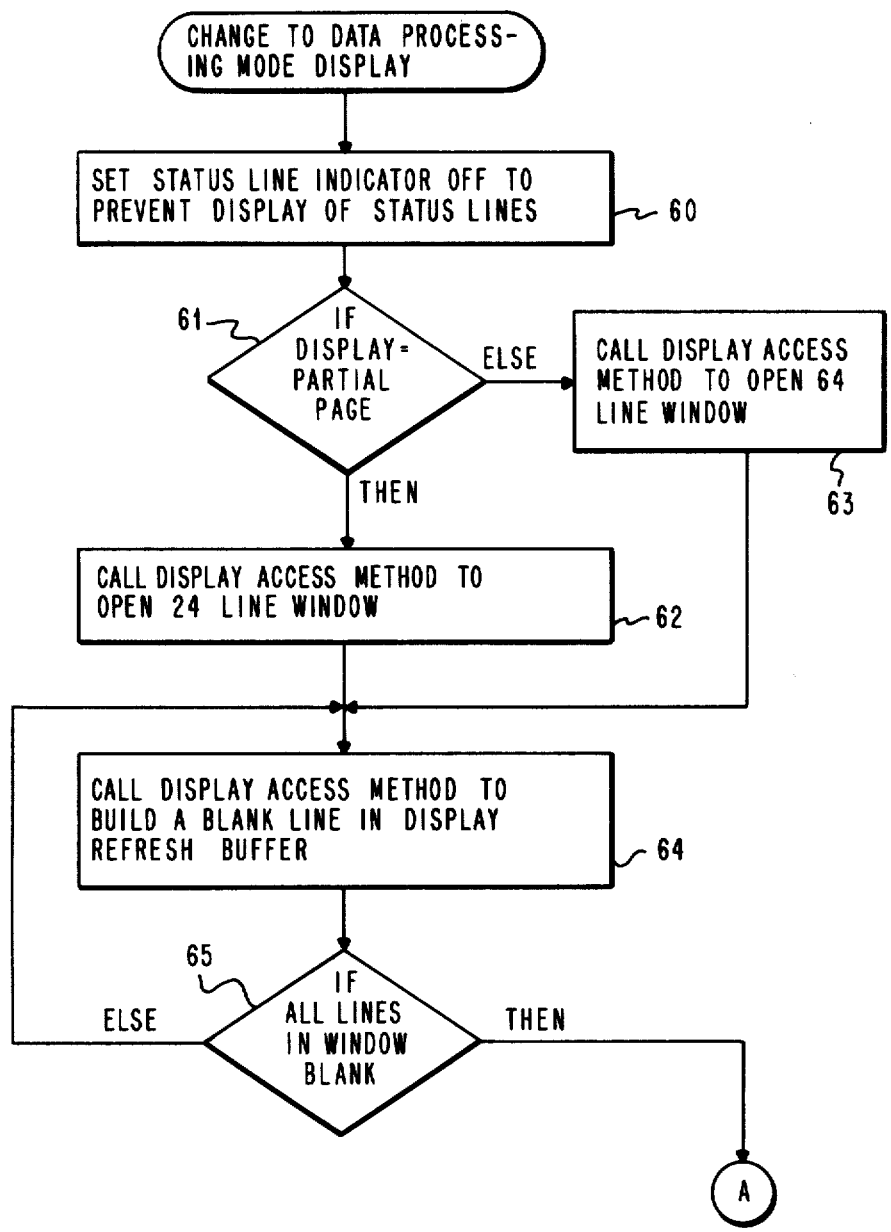
FIG. 7 is a flow chart of the routine involved in switching to a data processing session.
Figure 8:
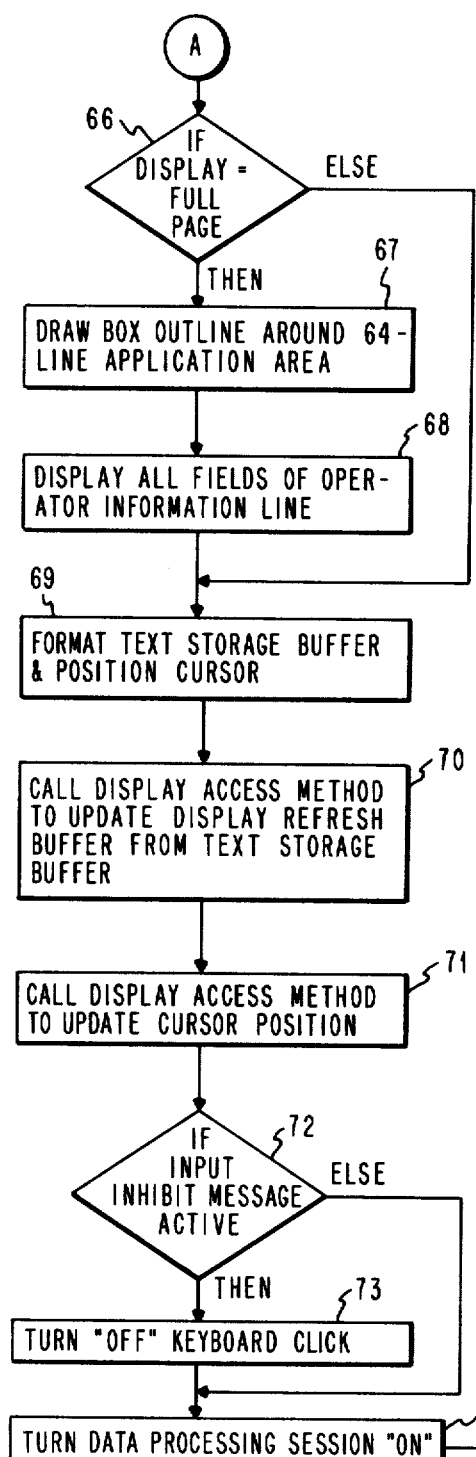
FIG. 8 is a continuation of the routine described in FIG. 7.

Now with respect to FIG. 7 we will describe the steps involved in the change to data processing session routine called for by step 51 in FIG. 4. First, step 60, status line indicator is turned off to prevent display of status lines. In the present data processing display format, no status lines will be displayed. Consequently, status lines which are displayed during the text processing session are turned off. This step is conducted under the control of the display manager 26, of FIG. 2. Next, still under the control of the display manager, a decision is made, block 61, as to whether the display is a partial page display. If this is so, then, the display access method 25, is called to open up a 24 line window in display refresh buffer 27, step 62. On the other hand, if display is not a partial page, then, under the control of the display manager, the display access method is called to open up a 64 line window in display refresh buffer 27, step 63.

Upon the opening of the appropriate window, the display refresh buffer must be blanked of data from prior session. Again, under the control of the display manager, the display access method 25 is called to blank a line in the display refresh buffer, step 64. This is followed by a determination, step 65, as to whether all of the lines in the selected window are blank. If all the lines are not blanked, the routine is looped back to step 64 and a succeeding line blanked. This procedure is continued until determination is made in decision step 65 that all the lines are blank; then the routine goes to point A in FIG. 8 still under the control of display manager 26. Here, a determination is made, step 66, if the display is a full page display. If so, then, step 67, a 64 line outline is drawn about an area in display refresh buffer 27 under the control of display access method 25, after which all fields of the operator information line are displayed, step 68. This is a conventional data processing display format.

On the other hand, if a determination is made in decision step 66 that the display is not a full page display, then steps 67 and 68 are skipped and the routine moves directly to step 69 which involves formatting the text storage buffer and positioning the cursor at the appropriate line in the text storage buffer. In this connection, the operation of the text storage buffer and its position cursor are described in detail in the above-mentioned co-pending U.S. application 274,050, Dennis G. Busch. In any event, if there has been a previous switch from a noncompleted data processing session to a text processing session, the data developed during the data processing session necessary to support the display will remain stored in said text storage buffer.

The loading of data into the text storage buffer 23 under the control of the host data processor 11 has been described hereinabove with respect to the apparatus of FIGS. 1 and 2. However, it should be noted that even during a text processing session, data relative to data processing sessions may be loaded into the text storage buffer under the control of the host data processor as previously described. Accordingly, if such data has been input into text storage buffer by the host data processor in a background operation during a text processing session, this information will be formatted in step 69. Next, step 70, display access method 25 is called to update the display refresh buffer 27 to reflect the current status of the text storage buffer 23. Then, the display access method is called to update the cursor position in the display refresh buffer in accordance to the indication of the cursor position in the text storage buffer.

Next, decision step 72, a determination is made as to whether the input inhibit message is active. If it is, then, the click is turned off, step 73.

It has been previously mentioned and will be hereinafter described in some detail, that during the period when the data processing session is taking place, certain text processing tasks such as printer control may also be taking place as background tasks. During the performance of such background tasks, it is sometimes necessary for the background text processing task to advise the operator with respect to the status of some problem. This is done by applying a message on the display screen 17 concerning this text processing status.

In addition, status messages will appear on the screen concerning the data processing session being carried out. Among such status messages will be those which require the operator to take action before continuing. These are referred to as input inhibit messages. Such input inhibit messages will cause the keyboard click to be turned off. This will give the operator the audible indication that such a message is present or active. On the other hand, if there is no such message, then, keyboard click is not turned off and routine proceeds to step 74 where data processing session is turned on, after which the routine is returned.

Figure 9:
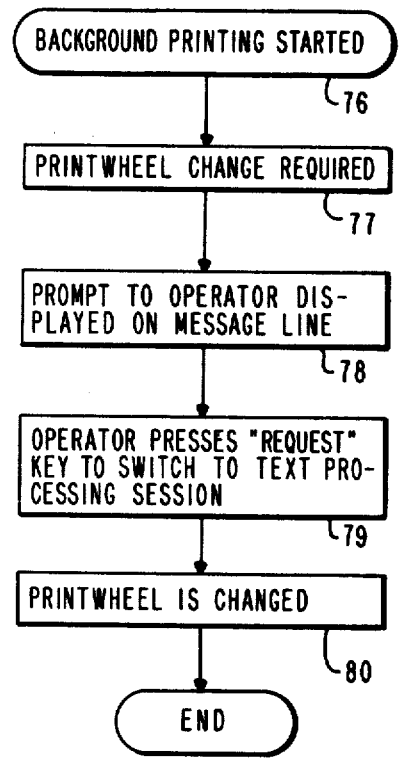
FIG. 9 is a flow chart illustrating how a background text processing task may initiate a switch from a data processing session to a text processing session.

Let us now consider an example of how a background text processing task can result in a switch from a data processing session to a text processing session on the display so that some action may be taken with respect to the background task. With reference to FIG. 9, let us assume that the system is operating during a data processing session. During this session, a background text processing task, i.e., printing on a document, step 76, is commenced. As the data processing session continues and the background task continues independently, the background task reaches a point where a print wheel change is required, 77. A message line on the display 17 during the data processing session, step 78, advises the operator of the problem. Then, step 79, the operator presses the request key to switch to a text processing session and does whatever text processing steps are required to change the print wheel, step 80, after which the routine is ended. At the end of this routine, the operator through the keyboard switches back to the non-completed data processing session using the techniques described hereinabove.

While the invention has been particularly shown and described with reference to a preferred embodiment it will be understood by those skilled in the art that various other changes in form and detail may be made without departing from the spirit and scope of the invention.

We claim:

1. In an information processing system for conducting data processing operations wherein the processing relates to the value of the information and conducting text processing operations wherein the processing relates only to the format of the information, the improvement comprising means for initiating a data processing session in said system, means for initiating a text processing session in said system, means for switching to said text processing session before the completion of said data processing session, means for storing the status of said non-completed data processing session during said text processing session, and means for switching back from said text processing session to said non-completed data processing session.

2. The information processing system of claim 1 wherein said system comprises a text processor having an interactive display terminal for conducting said text processing operations, a data processor for conducting said data processing operations, means activated during said data processing sessions for operating said text processor as an emulation of an interactive display terminal, and means for connecting said emulated display terminal to said data processor, whereby said emulated display terminal functions as a display terminal for said data processor.

3. The information processing system of claim 2 wherein said text processor further comprises a data entry keyboard, means for storing a plurality of different character sets, each set corresponding to said keyboard, means responsive to said switching to a data processing session for selecting a first character set and responsive to said switching to a text processing session for selecting a different character set and means for switching from said first selected character set to the different character set in response to said switching from said data processing session to said text processing session.

4. The information processing system of claim 2 wherein said text processor further includes means for conducting text processing operations as background tasks during data processing sessions, and wherein said means for switching to said text processing sessions switch to text processing sessions related to said background tasks.

5. The information processing system of claim 2 wherein said data processor further includes means for conducting data processing operations as background tasks during text processing sessions, and wherein said means for switching to said data processing sessions switch to data processing sessions related to said background tasks.

6. The information processing system of claim 1 further comprising a data entry keyboard, means for storing a plurality of different character sets, each set corresponding to said keyboard, means responsive to said switching to a data processing session for selecting a first character set and responsive to said switching to a text processing session for selecting a different character set, and means for switching from said first selected character set to the different character set in response to said switching from said data processing session to said text processing session.

7. The information processing system of claim 1 further comprising means for conducting text processing operations as background tasks during data processing sessions, and wherein said means for switching to said text processing sessions switch to text processing sessions related to said background tasks.

8. The information processing system of claim 1 further including means for conducting data processing operations as background tasks during text processing sessions, and wherein said means for switching to said data processing sessions switch to data processing sessions related to said background tasks.

9. In an information processing method for conducting data processing operations wherein the processing relates to the value of the information and conducting text processing operations wherein the processing relates only to the format of the information, the improvement comprising the steps of initiating a data processing session in said system, initiating a text processing session in said system, switching to said text processing session before the completion of said data processing session, storing the status of said non-completed data processing session during said text processing session, and switching back from said text processing session to said non-completed data processing session.

10. The information processing method of claim 9 comprising the further step of conducting text processing operations as background tasks during data processing sessions.

11. The information processing method of claim 10 wherein the step of switching to a text processing session switches to text processing session relating to one of said background tasks.

* * * * *